United States Patent
Strandborg et al.

(10) Patent No.: US 12,045,932 B2
(45) Date of Patent: Jul. 23, 2024

(54) IMAGE RECONSTRUCTION WITH VIEW-DEPENDENT SURFACE IRRADIANCE

(71) Applicant: Varjo Technologies Oy, Helsinki (FI)

(72) Inventors: Mikko Strandborg, Hangonkylä (FI); Kimmo Roimela, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 180 days.

(21) Appl. No.: 17/881,264

(22) Filed: Aug. 4, 2022

(65) Prior Publication Data

US 2024/0046556 A1   Feb. 8, 2024

(51) Int. Cl.
| | |
|---|---|
| *G06T 15/50* | (2011.01) |
| *G06T 3/40* | (2006.01) |
| *G06T 7/11* | (2017.01) |
| *G06T 7/90* | (2017.01) |

(Continued)

(52) U.S. Cl.
CPC ............ *G06T 15/503* (2013.01); *G06T 3/40* (2013.01); *G06T 7/11* (2017.01); *G06T 7/90* (2017.01); *G06T 15/205* (2013.01); *G06T 19/006* (2013.01); *G06T 2200/08* (2013.01); *G06T 2207/10024* (2013.01); *G06T 2207/10028* (2013.01); *G06T 2207/20021* (2013.01); *G06T 2210/56* (2013.01)

(58) Field of Classification Search
CPC . G06T 15/503; G06T 3/40; G06T 7/11; G06T 7/90; G06T 15/205; G06T 19/006; G06T 2200/08; G06T 2207/10024; G06T 2207/10028; G06T 2207/20021; G06T 2210/56; G06T 9/20; G06T 2210/36; G06T 15/04; G06T 15/20; G06T 17/00
See application file for complete search history.

(56) References Cited

U.S. PATENT DOCUMENTS

| 10,192,353 B1 * | 1/2019 | Chou ..................... G06T 17/00 |
| 2016/0042551 A1 | 2/2016 | Imber et al. |
| 2018/0310025 A1 | 10/2018 | Keränen et al. |

FOREIGN PATENT DOCUMENTS

WO    2021191500 A1    9/2021

OTHER PUBLICATIONS

European Patent Office, Application No. 23178336.6, mailed Jan. 29, 2024, 12 pages.

(Continued)

*Primary Examiner* — William A Beutel
(74) *Attorney, Agent, or Firm* — Ziegler IP Law Group LLC

(57) ABSTRACT

A computer-implemented method including: receiving visible-light images captured from viewpoints using visible-light camera(s); creating 3D model of real-world environment, wherein 3D model stores colour information pertaining to 3D points on surfaces of real objects (204); dividing 3D points into groups of 3D points, based on at least one of: whether surface normal of 3D points in group lie within predefined threshold angle from each other, differences in materials of real objects, differences in textures of surfaces of real objects; for group of 3D points, determining at least two of visible-light images in which group of 3D points is captured from different viewpoints, wherein said images are representative of different surface irradiances of group of 3D points; and storing, in 3D model, information indicative of different surface irradiances.

15 Claims, 2 Drawing Sheets

(51) Int. Cl.
*G06T 15/20* (2011.01)
*G06T 19/00* (2011.01)

(56) References Cited

OTHER PUBLICATIONS

Sudipta et al., "Image-based rendering for scenes with reflections", ACM Transactions on Graphics, vol. 31, No. 4, Jul. 1, 2012, ISSN: 0730-0301, DOI: 10.1145/2185520.2185596, 10 pages.
Zhirkov et al., "View-Dependent Octree Image Rendering" GraphiCon 2003 Proceedings Sep. 5-10, 2003, XP055499709, http;//graphicon.ru/html/2003/Proceedings/Technical/paper804.pdf, 5 pages.

\* cited by examiner

IMAGE RECONSTRUCTION WITH VIEW-DEPENDENT SURFACE IRRADIANCE

TECHNICAL FIELD

The present disclosure relates to computer-implemented methods for improving image reconstructions with view-dependent surface irradiances. The present disclosure relates to systems for improving image reconstructions with view-dependent surface irradiances. The present disclosure relates to computer program products for improving image reconstructions with view-dependent surface irradiances.

BACKGROUND

With advancements in evolving technologies such as immersive extended-reality (XR) technologies, demand for high-quality image generation has been increasing. It is desired that the image generation is performed in real time. Several advancements are being made to develop image generation techniques that facilitate generation of high-quality images using image reconstruction (namely, image resynthesis).

However, existing techniques and equipment for image generation have several limitations associated therewith. The existing techniques and equipment are not well-suited for high-fidelity image reconstruction that aims to generate images from a novel viewpoint. This is because the existing techniques fail to correctly capture and reproduce viewpoint-dependent lighting such as specular highlights or reflections in a real-world environment, and to properly reconstruct real objects present in the real-world environment. Moreover, an image reconstruction model (for example, a neural-network-based image reconstruction model) that is to be employed for the image reconstruction lacks a required resolution which is necessary for the high-fidelity image reconstruction, as said model has limited capability in terms of representing realistic visual details of the real-world environment. Therefore, the generated images do not emulate image viewing characteristics of the human visual system. In other words, the generated images are suboptimal (i.e., low quality and unrealistic), and are often generated with considerable latency/delay. This may, for example, lead to a poor, non-immersive viewing experience for a user.

Therefore, in light of the foregoing discussion, there exists a need to overcome the aforementioned drawbacks associated with existing techniques and equipment for image generation.

SUMMARY

The present disclosure seeks to provide a computer-implemented method for improving image reconstruction with view-dependent surface irradiance. The present disclosure also seeks to provide a system for improving image reconstruction with view-dependent surface irradiance. The present disclosure further seeks to provide a computer program product for improving image reconstruction with view-dependent surface irradiance. An aim of the present disclosure is to provide a solution that overcomes at least partially the problems encountered in prior art.

In a first aspect, an embodiment of the present disclosure provides a computer-implemented method comprising:
  receiving visible-light images of a given real-world environment that are captured from a plurality of viewpoints using at least one visible-light camera;
  processing the visible-light images, based on the plurality of viewpoints, to create a three-dimensional (3D) model of the given real-world environment, wherein the 3D model stores colour information pertaining to 3D points on surfaces of real objects present in the given real-world environment;
  dividing the 3D points into a plurality of groups of 3D points, based on at least one of: whether a surface normal of 3D points in a given group lie within a predefined threshold angle from each other, differences in materials from which the real objects are made, differences in textures of the surfaces of the real objects;
  for a given group of 3D points, determining at least two of the visible-light images in which the given group of 3D points is captured from different viewpoints, wherein the at least two of the visible-light images are representative of different surface irradiances of the given group of 3D points as captured from the different viewpoints; and
  storing, in the 3D model of the given real-world environment, information indicative of the different surface irradiances of the given group of 3D points as captured from the different viewpoints.

In a second aspect, an embodiment of the present disclosure provides a system comprising:
  at least one server configured to:
    receive visible-light images of a given real-world environment that are captured from a plurality of viewpoints using at least one visible-light camera;
    process the visible-light images, based on the plurality of viewpoints, to create a three-dimensional (3D) model of the given real-world environment, wherein the 3D model stores colour information pertaining to 3D points on surfaces of real objects present in the given real-world environment;
    divide the 3D points into a plurality of groups of 3D points, based on at least one of: whether a surface normal of 3D points in a given group lie within a predefined threshold angle from each other, differences in materials from which the real objects are made, differences in textures of the surfaces of the real objects;
    for a given group of 3D points, determine at least two of the visible-light images in which the given group of 3D points is captured from different viewpoints, wherein the at least two of the visible-light images are representative of different surface irradiances of the given group of 3D points as captured from the different viewpoints; and
    store, in the 3D model of the given real-world environment, information indicative of the different surface irradiances of the given group of 3D points as captured from the different viewpoints; and
  a data repository, communicably coupled to the at least one server, that is to be employed to store the 3D model.

In a third aspect, an embodiment of the present disclosure provides a computer program product comprising a non-transitory machine-readable data storage medium having stored thereon program instructions that, when executed by a processor, cause the processor to:
  receive visible-light images of a given real-world environment that are captured from a plurality of viewpoints using at least one visible-light camera;
  process the visible-light images, based on the plurality of viewpoints, to create a three-dimensional (3D) model of the given real-world environment, wherein the 3D model stores colour information pertaining to 3D points on surfaces of real objects present in the given real-world environment;

divide the 3D points into a plurality of groups of 3D points, based on at least one of: whether a surface normal of 3D points in a given group lie within a predefined threshold angle from each other, differences in materials from which the real objects are made, differences in textures of the surfaces of the real objects;

for a given group of 3D points, determine at least two of the visible-light images in which the given group of 3D points is captured from different viewpoints, wherein the at least two of the visible-light images are representative of different surface irradiances of the given group of 3D points as captured from the different viewpoints; and store, in the 3D model of the given real-world environment, information indicative of the different surface irradiances of the given group of 3D points as captured from the different viewpoints.

Embodiments of the present disclosure substantially eliminate or at least partially address the aforementioned problems in the prior art, and facilitate a simple, fast, accurate, and improved image reconstruction with view-dependent surface irradiance, thereby generating output images having high realism and high visual fidelity in real time or near-real time.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
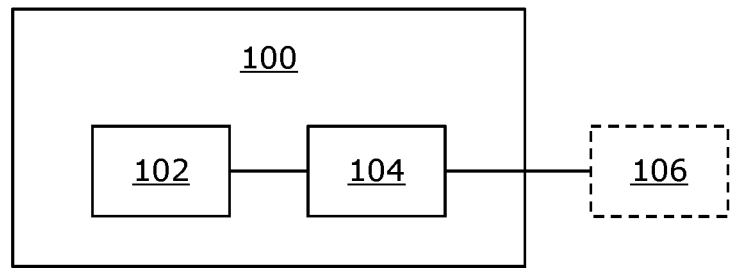
FIG. 1 illustrates a block diagram of an architecture of a system for improving image reconstruction with view-dependent surface irradiance, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a computer-implemented method comprising:

receiving visible-light images of a given real-world environment that are captured from a plurality of viewpoints using at least one visible-light camera;

processing the visible-light images, based on the plurality of viewpoints, to create a three-dimensional (3D) model of the given real-world environment, wherein the 3D model stores colour information pertaining to 3D points on surfaces of real objects present in the given real-world environment;

dividing the 3D points into a plurality of groups of 3D points, based on at least one of: whether a surface normal of 3D points in a given group lie within a predefined threshold angle from each other, differences in materials from which the real objects are made, differences in textures of the surfaces of the real objects;

for a given group of 3D points, determining at least two of the visible-light images in which the given group of 3D points is captured from different viewpoints, wherein the at least two of the visible-light images are representative of different surface irradiances of the given group of 3D points as captured from the different viewpoints; and storing, in the 3D model of the given real-world environment, information indicative of the different surface irradiances of the given group of 3D points as captured from the different viewpoints.

In a second aspect, an embodiment of the present disclosure provides a system comprising:

at least one server configured to:

receive visible-light images of a given real-world environment that are captured from a plurality of viewpoints using at least one visible-light camera;

process the visible-light images, based on the plurality of viewpoints, to create a three-dimensional (3D) model of the given real-world environment, wherein the 3D model stores colour information pertaining to 3D points on surfaces of real objects present in the given real-world environment;

divide the 3D points into a plurality of groups of 3D points, based on at least one of: whether a surface normal of 3D points in a given group lie within a predefined threshold angle from each other, differences in materials from which the real objects are made, differences in textures of the surfaces of the real objects;

for a given group of 3D points, determine at least two of the visible-light images in which the given group of 3D points is captured from different viewpoints, wherein the at least two of the visible-light images are representative of different surface irradiances of the given group of 3D points as captured from the different viewpoints; and store, in the 3D model of the given real-world environment, information indicative of the different surface irradiances of the given group of 3D points as captured from the different viewpoints; and a data repository, communicably coupled to the at least one server, that is to be employed to store the 3D model.

In a third aspect, an embodiment of the present disclosure provides a computer program product comprising a non-transitory machine-readable data storage medium having stored thereon program instructions that, when executed by a processor, cause the processor to:

receive visible-light images of a given real-world environment that are captured from a plurality of viewpoints using at least one visible-light camera;

process the visible-light images, based on the plurality of viewpoints, to create a three-dimensional (3D) model of the given real-world environment, wherein the 3D model stores colour information pertaining to 3D points on surfaces of real objects present in the given real-world environment;

divide the 3D points into a plurality of groups of 3D points, based on at least one of: whether a surface normal of 3D points in a given group lie within a predefined threshold angle from each other, differences in materials from which the real objects are made, differences in textures of the surfaces of the real objects;

for a given group of 3D points, determine at least two of the visible-light images in which the given group of 3D points is captured from different viewpoints, wherein the at least two of the visible-light images are representative of different surface irradiances of the given group of 3D points as captured from the different viewpoints; and store, in the 3D model of the given real-world environment, information indicative of the different surface irradiances of the given group of 3D points as captured from the different viewpoints.

The present disclosure provides the aforementioned computer-implemented method, the aforementioned system, and the aforementioned computer program product, which facilitate a simple, fast, accurate, and improved image reconstruction with view-dependent surface irradiance. The method and the system are susceptible to be implemented for storing the information indicative of the different surface irradiances in the 3D model, and for subsequently utilising said information when generating (namely, reconstructing) a high fidelity output image from a perspective of a novel viewpoint. Surface irradiances (such as specular highlights, reflections, and the like) corresponding to the surfaces of the real objects are correctly captured and reproduced in the generated output image. Output images (corresponding to different novel viewpoints) generated in this manner are of high quality and are realistic, and are generated in real time or near-real time (without any latency/delay), as compared to existing techniques for image reconstruction. This potentially leads to a realistic, immersive viewing experience for a user, when these output images are displayed to the user. Moreover, the aforesaid information can be beneficially utilized with any type of 3D model (for example, such as an image-based 3D model, a 3D point cloud, a 3D polygonal mesh, and the like) for image reconstruction purposes. The computer-implemented method and the system are simple, robust, reliable, support real-time high-quality image reconstruction, and can be implemented with ease.

Furthermore, the computer-implemented method could be employed to store the information indicative of the different surface irradiances for any static surface at a resolution that is freely selectable based on user preferences, specific use cases, available storage space, and other factors. It will be appreciated that the method is configured to identify that the given group of 3D points pertains to a same 3D location in a world-space coordinate system of the real-world environment, even though it has the different surface irradiances (seen as different colours in the at least two of the visible-light images) from the different viewpoints.

Additionally, the method could be applied to rigid dynamic objects as well. In such a scenario, a direction of a depth axis of a given visible-light image representing a given dynamic object is optionally stored in the world-space coordinate system of the real-world environment. As a result, rotating the given dynamic object would not rotate the given visible-light image. This beneficially provides a rough approximation of an actual surface irradiance even for dynamic objects, when an output image is to be generated from a new viewpoint.

Moreover, certain areas of the given real-world environment that are prone to changes in colour information (for example, such as an area wherein a television screen or a monitor is displaying visual content that is continually changing) can be priorly marked, so that the at least one server knows that the changes in the colour information in surfaces of those certain areas are not caused by view dependency.

Notably, the at least one server controls an overall operation of the system. In some implementations, the at least one server is implemented as a remote server. In such implementations, the remote server receives the visible-light images from the at least one visible-light camera (or a device comprising the at least one visible-light camera), or from the data repository. In an example, the remote server could be a cloud server that provides a cloud computing service. Examples of the device include, but are not limited to, a head-mounted display device and a teleport device. In other implementations, the at least one server is implemented as a processor of the device comprising the at least one visible-light camera or as a processor of the computing device communicably coupled to the device. Examples of the computing device include, but are not limited to, a laptop, a desktop, a tablet, a phablet, a personal digital assistant, a workstation, and a console.

It will be appreciated that the term "at least one server" refers to "a single server" in some implementations, and to "a plurality of servers" in other implementations. When the system comprises the single server, all operations of the system are performed by the single server. When the system comprises the plurality of servers, different operations of the system are performed by different (specially configured) servers from amongst the plurality of servers. As an example, a first server from amongst the plurality of servers may be configured to process the visible-light images for creating the 3D model, and a second server from amongst the plurality of servers may be configured to divide the 3D points into the plurality of groups of 3D points.

Throughout the present disclosure, the term "data repository" refers to hardware, software, firmware, or a combination of these for storing at least the 3D model, and optionally, the visible-light images. It will be appreciated that the data repository could be implemented, for example, such as a memory of the at least one server, a memory of the computing device, a removable memory, a cloud-based database, or similar.

Throughout the present disclosure, the term "visible-light camera" refers to an equipment that is operable to detect and process visible-light signals received from the given real-world environment, so as to capture a given visible-light image of the given real-world environment. Examples of the at least one visible-light camera include, but are not limited to, a Red-Green-Blue (RGB) camera, a Red-Green-Blue-Alpha (RGB-A) camera, a Red-Green-Blue-Depth (RGB-D) camera, an event camera, and a monochrome camera. It will be appreciated that the given visible-light image is a visual representation of the given real-world environment. The term "visual representation" encompasses colour information represented in the given visible-light image, and additionally optionally other attributes associated with the given visible-light image (for example, such as depth information, luminance information, transparency information, and the like).

Throughout the present disclosure, the term "viewpoint" encompasses both a viewing position at which the at least one visible-light camera is positioned in the given real-world environment as well as a viewing direction in which the at least one visible-light camera is capturing visible-light image(s). It will be appreciated that multiple real objects or their portions span across a field of view of a given visible-light camera; therefore, for a given image that is captured from a given viewpoint, light reflecting off these real objects or their portions is incident upon a sensor chip of the given visible-light camera at different incident angles. As an example, when an angular width of a horizontal field of view of the given visible-light camera is 90 degrees, these real objects or their portions are captured in the given visible-light image such that information pertaining to the surface irradiances of these real objects or their portions is captured from −45 degrees to +45 degrees from a centre of the field of view. Thus, a given viewpoint from which a given group of 3D objects (namely, a given real object or its part) is captured not only depends on a viewing position and a viewing direction of a visible-light camera, but also on which part of the field of view of the visible-light camera is the given group of 3D objects captured.

Optionally, the at least one visible-light camera is movable in the given real-world environment, so as to capture the visible-light images from the plurality of viewpoints. In this regard, a pose of the at least one visible-light camera changes, i.e., at least an orientation of the at least one visible-light camera changes with respect to time. It will be appreciated that at least the orientation of the at least one visible-light camera may be adjusted (namely, changed) by using a motorised actuator. In such a case, information pertaining to the orientation of the at least one visible-light camera could be accurately known (to the at least one server). The actuator may be driven by an actuation signal, for example, such as a piezoelectric force, an electromagnetic force, a mechanical torque, an electric current, or similar. Notably, different poses of the at least one visible-light camera serve as different (known) viewpoints for capturing the visible-light images. The term "pose" encompasses both a position and an orientation.

Optionally, the system further comprises pose-tracking means for tracking a pose of the at least one visible-light camera. It will be appreciated that the pose-tracking means could be implemented as at least one of: an optics-based tracking system (which utilizes, for example, infrared beacons and detectors, infrared cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU). Optionally, the at least one server is configured to process pose-tracking data, collected by the pose-tracking means, to track the pose of the at least one visible-light camera. The pose-tracking means may employ an outside-in tracking technique, an inside-out tracking technique, or a combination of both the aforesaid techniques, for collecting the pose-tracking data. The pose-tracking data may be in form of images, IMU/TIMU values, motion sensor data values, magnetic field strength values, or similar.

Optionally, the at least one visible-light camera is arranged on a device present in the given real-world environment. Such a device could be arranged at a fixed location within the given real-world environment. Optionally, in such a case, the device is stationary in the given real-world environment. Additionally or alternatively, the device could be a wearable device being worn by a user present in the given real-world environment. In such a case, a location of such a device changes with a change in a location of its user. Likewise, the device could be arranged on, for example, a drone, a robot, or similar. As an example, the device could be arranged on a support structure that is capable of a three-dimensional (3D) rotation (and additionally, capable of a translation motion). The support structure can be moved to any required location in the given real-world environment. It will be appreciated that when the at least one visible-light camera is implemented as a plurality of visible-light cameras, some visible-light cameras may be arranged at a fixed location within the given real-world environment (i.e., some visible-light cameras may be stationary in the given real-world environment), while other visible-light cameras may be movable in the given real-world environment.

As an example, the device may be implemented as a head-mounted display (HMD) device, a teleport device, and the like. The term "head-mounted display" device refers to a specialized equipment that is configured to present an extended-reality (XR) environment to a user when said HMD device, in operation, is worn by the user on his/her head. The HMD device is implemented, for example, as an XR headset, a pair of XR glasses, and the like, that is operable to display a visual scene of the XR environment to the user. The term "extended-reality" encompasses virtual reality (VR), augmented reality (AR), mixed reality (MR), and the like. The term "teleport device" refers to a specialized equipment that is capable of facilitating virtual teleportation.

Throughout the present disclosure, the term "three-dimensional model" of the given real-world environment refers to a data structure that comprises comprehensive information pertaining to the real objects present in the given real-world environment. Such a comprehensive information comprises at least colour information pertaining to the 3D points on the surfaces of the real objects. Optionally, the colour information pertaining to the 3D points is in a form of one of:

Red-Green-Blue (RGB) values, Red-Green-Blue-Alpha (RGB-A) values, Red-Green-Blue-Depth (RGB-D) values, Cyan-Magenta-Yellow-Black (CMYK) values, Luminance and two colour differences (YUV) values.

Such comprehensive information could also be indicative of at least one of: a plurality of features of the real objects, depth information of the real objects or their portions, shapes and sizes of the real objects or their portions, poses of the real objects or their portions, materials of the real objects or their portions, surface textures of the real objects or their portions, light sources and lighting conditions within the given real-world environment. It will be appreciated that the real object could be a living object (for example, such as a human, a pet, a tree, and the like) or a non-living object (for example, such as sky, a building, a road, a tile, a toy, a bottle, a letter box, and the like). Examples of the plurality of features include, but are not limited to, edges, corners, blobs and ridges. Optionally, the 3D model of the given real-world environment is in a form of at least one of: a 3D polygonal mesh, a 3D point cloud, a 3D surface cloud, a voxel-based model, a parametric model, a 3D grid, a 3D hierarchical grid, a bounding volume hierarchy, an image-based 3D model. The 3D polygonal mesh could be a 3D triangular mesh or a 3D quadrilateral mesh. It will be appreciated that a given 3D point on a surface of a real object may correspond to a given voxel in the voxel-based (3D) model.

Optionally, when the visible-light images are processed based on the plurality of viewpoints, the visible-light images are associated with corresponding viewpoints wherefrom the at least one visible-light camera has captured the visible-light images, to enable the at least one server for accurately determining shapes of the surfaces of the real objects or their portions that are visible in the visible-light images from various perspectives of the corresponding viewpoints. Such a determination is well-utilized by the at least one server when generating the comprehensive information constituting the 3D model of the given real-world environment. Beneficially, the 3D model generated in such a manner is highly accurate, realistic, and is information-rich.

Optionally, when processing the plurality of visible-light images to create the 3D model of the given real-world environment, the at least one server is configured to employ at least one data processing algorithm. Optionally, in this regard, the at least one data processing algorithm is at least one of: a feature extraction algorithm, an image stitching algorithm, an image merging algorithm, an interpolation algorithm, a 3D modelling algorithm, a photogrammetry algorithm, an image layering algorithm, an image blending algorithm. Such data processing algorithms are well-known in the art.

Notably, the 3D points on the surfaces of the real objects are divided (namely, categorised or classified) into the plurality of groups of 3D points, in order to (subsequently) determine visible-light images in which a given group of 3D points is captured from different viewpoints. In this regard, when a surface normal of some neighbouring 3D points lie within the predefined threshold angle from each other, a geometrical orientation of these neighbouring 3D points would be approximately along a same direction. Thus, such neighbouring 3D points could be grouped together into a given group of 3D points. As an example, the given group of 3D points may represent a real object (such as a floor, a table, a wall, or similar) having a flat surface or a curved surface. Optionally, the predefined threshold angle lies in a range of 1 degree to 20 degrees; more optionally, in a range of 1 degree to 10 degrees. As an example, the predefined threshold angle may lie from 1, 2 or 5 degrees up to 5, 10, 15 or 20 degrees. It will be appreciated that since the 3D model is created by the at least one server, information regarding the surface normal of the 3D points is readily and accurately known to the at least one server.

Furthermore, different groups of 3D points could correspond to different types of materials, i.e., a given group of 3D points on a surface of a given real object may correspond to a particular type of material from which the given real object is made. It will be appreciated that the given real object may be made of a single material or a plurality of materials. In this regard, when the given real object is made of the plurality of materials, different portions of the given real object could be made of different materials. In an example, a food storage container present in the given real-world environment may be made of two materials, wherein a body of the food storage container is made of steel and a lid of the food storage container is made of plastic. A material from which the given real object is made belongs to a corresponding material category (for example, such as fabric, stone, metal, wood, foliage, plastic, glass, water, leather, and the like). As an example, a 'plastic' material category may comprise materials like polyethylene terephthalate, polypropylene, polystyrene, or similar. As another example, a 'fabric' material category may comprise materials like cotton, polyester, silk, nylon, wool, lace, jute, or similar.

Moreover, different groups of 3D points may correspond to different textures of the surfaces of the real objects, i.e., a given group of 3D points may correspond to a particular texture of the surface of the given real object. A texture of the surface of the given real object could be planar (namely, flat), curved, wavy, freeform, or similar. It will be appreciated that the texture of the surface could depend on the type of material from which the surface is made.

It will also be appreciated that optionally since the 3D model is created by the at least one server, information regarding the materials from which the real objects are made and the textures of the surfaces of the real objects could be readily and accurately determined by the at least one server from the comprehensive information constituting the 3D model. Thus, the at least one server can easily divide the 3D points into the plurality of groups of 3D points, based on at least one of: the differences in the materials from which the real objects are made, the differences in the textures of the surfaces of the real objects. Alternatively, optionally, the at least one server is configured to analyse the visible-light images to identify at least one material category to which the real objects or their portions belong, wherein each real object or its portion belongs to its corresponding material category. Such an operation may also be referred to as 'material segmentation' of the given real-world environment. Optionally, in this regard, the at least one server is configured to: divide a given visible-light image into a plurality of segments, based upon a spatial geometry of the real objects present in the given real-world environment; and identify the at least one material category to which the plurality of segments belong. It will be appreciated that the at least one server is optionally configured to train at least one neural network to identify the at least one material category to which the real objects or their portions belong. The at least one server may use at least one predefined material database for the aforesaid training.

Furthermore, optionally, when determining the at least two of the visible-light images in which the given group of 3D points is captured from different viewpoints, the at least one server is configured to analyse a given visible-light image, based on a corresponding viewpoint from which the given visible-light image is captured, to detect whether the given group of 3D points lies within a field of view of the given visible-light image.

Throughout the present disclosure, the term "surface irradiance" refers to a view-dependent visual effect that is apparent in a given visible-light image captured from a given viewpoint. In other words, the surface irradiance in the given visible-light image represents how a surface of a given real object would appear (for example, to a viewer) from a given viewpoint. Thus, the surface irradiance in the given visible-light image may appear, for example, as bright spots (such as reflections), specular highlights, anisotropic highlights, or similar, in different parts of the given visible-light image. It will be appreciated that the different surface irradiances represented in the at least two of the visible-light images may have different sizes, different shapes, and/or different locations in the at least two of the visible-light images. The surface irradiances typically arise from a relative position of the surfaces of the real objects with respect to at least one light source. The at least one light source could be an artificial light source (such as a lamp, a tube light, a light-emitting element) or a natural light source (such as the Sun) present in the given real-world environment.

Once the at least two of the visible-light images are determined, the information indicative of the different surface irradiances is stored in the 3D model in order to subsequently enable realistic and accurate generation of the output image. It will be appreciated that said information is stored in the 3D model as well as retrieved from the 3D model (as and when required) by the at least one server in real time or near-real time. The data repository is optionally configured to update (in real time or near-real time) the aforesaid information in the 3D model. Pursuant to embodiments, the information indicative of the different surface irradiances comprises one of: lower-resolution copies of the at least two of the visible-light images, colour difference maps, spherical harmonic coefficients, which are now described hereinbelow in detail.

Optionally, the 3D model of the given real-world environment is implemented as a 3D data structure comprising a plurality of nodes, each node representing a respective convex-polyhedral region of a 3D space occupied by the given real-world environment, wherein each node stores corresponding portions of the visible-light images whose pixels' 3D positions fall inside a respective convex-polyhedral region of the 3D space. For a visible-light image captured from a given viewpoint, each portion of the visible-light image is stored in a corresponding node along with a direction vector indicating any one of: a direction of a depth axis of the visible-light image from the given viewpoint, or a view direction from the given viewpoint to a corresponding convex-polyhedral region.

In this regard, the 3D space occupied by the given real-world environment is divided into convex-polyhedral regions represented by the plurality of nodes. These convex-polyhedral regions enable in effectively modelling the 3D space occupied by the given real-world environment. It will be appreciated that a number of nodes in the 3D data structure is equal to a number of convex-polyhedral regions. Moreover, a given real-world region (represented by at least one pixel) may be stored in more than one node of the 3D data structure. Herein, the term "convex-polyhedral region" refers to a region that is shaped as a polyhedron, wherein the polyhedron is convex. A polyhedron is said to be convex if a line segment joining any two points of the polyhedron lies inside a surface of the polyhedron. In other words, a polyhedron is said to be convex if its polygonal faces are convex (i.e., bulging outwards). Examples of the convex-polyhedral regions include, but are not limited to, cubes, cuboids, convex dodecahedrons, and convex icosahedrons.

In an embodiment, the convex-polyhedral regions are of a same size. In another embodiment, the convex-polyhedral regions are of varying sizes. The variation in size of the convex-polyhedral regions may be random, linear, non-linear, exponential, or similar. Moreover, optionally, a size of a given convex-polyhedral region is determined dynamically, based on an availability and a quality of the visible-light images (i.e., an input data for the at least one server) representing the given convex-polyhedral region. Greater a number of available visible-light images representing the given convex-polyhedral region, smaller is the size of the given convex-polyhedral region, and vice versa. Higher the quality of the visible-light images representing the given convex-polyhedral region, smaller is the size of the given convex-polyhedral region, and vice versa.

It will be appreciated that the direction vector associated with a given portion of the visible-light image indicates a direction corresponding to a perspective from which the given portion can be represented and stored in the 3D data structure. Storing information pertaining to the direction vector could be beneficial since it may be utilized for generating a perspective-correct representation of the given portion at a time of generating the output image using the 3D data structure. Optionally, when the direction vector indicates the direction of the depth axis of the visible-light image from the given viewpoint, the direction vector serves as a face normal of the visible-light image. The visible-light image has only one face normal, the face normal indicating how the visible-light image is oriented in the 3D space. The face normal of the visible-light image is different from surface normals of portions of the visible-light image. Information pertaining to such a direction vector is stored in the corresponding node in an implementation where the portions of the visible-light images are stored in a form of orthographic projections. The depth axis may, for example, be a Z-axis. Alternatively, optionally, when the direction vector indicates the view direction from the given viewpoint to the corresponding convex-polyhedral region, the direction vector represents the view direction employed by a corresponding visible-light camera for capturing the corresponding convex-polyhedral region. Information pertaining to such a direction vector is stored in an implementation where the portions of the visible-light images are stored in a form of perspective projections.

In an example, the convex-polyhedral regions are cubes having a size, for example, 20 centimetres×20 centimetres. In this regard, each non-empty node of the 3D data structure may store one or more faces of a corresponding cube that visually represent geometric shapes of real objects present therein. The geometric shapes lying inside a boundary of the non-empty node can be represented in one face having a straight surface or a curved surface without a need to store any information pertaining to a direction vector. For example, visual information of a part of a wall only needs to be stored from one direction to accurately capture its geometry.

Moreover, optionally, the information indicative of the surface irradiances of the given group can be reused for a neighbouring group of 3D points. This may be particularly beneficial when the neighbouring group of 3D points does not have any information indicative of surface irradiances from a particular viewpoint. In this manner, larger regions of the given real-world environment can be grouped together to approximate more realistic view-dependent visual effects.

In an embodiment, the method further comprises processing the at least two of the visible-light images to generate lower-resolution copies of the at least two of the visible-light images, wherein the information indicative of the different surface irradiances of the given group of 3D points comprises portions of the lower-resolution copies of the at least two of the visible-light images that represent the given group of 3D points.

In this regard, instead of storing portions of original copies of the at least two of the visible-light images (that have large sizes and higher visual detail), the at least one server generates and stores the portions of the lower-resolution copies of the at least two of the visible-light images (that have relatively smaller sizes and lower visual detail) as the aforesaid information. It will be appreciated that storage (as well as retrieval) of said portions of the lower-resolution copies of the at least two of the visible-light images as the aforesaid information is neither computationally intensive nor time consuming. Moreover, the aforesaid information comprising the portions of the lower-resolution copies of the at least two of the visible-light images is transmitted (by the at least one server) to the data repository in a bandwidth-efficient manner, and is stored at the data repository (in the 3D model) in a space-efficient manner. It will be appreciated that despite having lower visual detail as compared to the at least two of the visible-light images, colour information of the lower-resolution copies of the at least two of the visible-light images could be subsequently employed by the at least one server when generating the output image (corresponding to a new viewpoint i.e., a novel viewpoint), without noticeably degrading the quality of the output image. Beneficially, the (generated) output image would be highly accurate and realistic.

In another embodiment, the computer-implemented method further comprises:
   processing the at least two of the visible-light images to generate lower-resolution copies of the at least two of the visible-light images; and
   generating colour difference maps representative of colour differences in the lower-resolution copies of the at least two of the visible-light images with respect to the at least two of the visible-light images, wherein the information indicative of the different surface irradiances of the given group of 3D points comprises portions of the colour difference maps that represent the given group of 3D points.

Herein, the term "colour difference map" refers to a 2D data structure storing information pertaining to colour differences in a given lower-resolution copy of a given visible-light image with respect to the given visible-light image. It will be appreciated that the colour differences could be expressed as one of: RGB difference values, RGB-A difference values, RGB-D difference values, CMYK difference values, YUV difference values. Optionally, when generating the colour difference map, the at least one server is configured to employ at least one of: a CIELab-based colour difference formula, a CIEDE2000-based colour difference formula. Such formulae are well-known in the art. Alternatively, optionally, when generating the colour difference map, the at least one server is configured to compute a colour difference between colour information present in the given lower-resolution copy of the given visible-light image and colour information captured in the given visible-light image, in a pixel-by-pixel manner. In an example, an RGB value of a given pixel in the given lower-resolution copy of the given visible-light image may be 128, 80, and 210, respectively, and an RGB value of a corresponding pixel in the given visible-light image may be 178, 102, and 255, respectively. Herein, the (RGB) colour difference is computed as 50, 22, and 45.

It will be appreciated that storage (as well as retrieval) of the portions of the colour difference maps as the aforesaid information is neither computationally intensive nor time consuming. In fact, storing the portions of the colour difference maps is potentially more efficient than storing the portions of the lower-resolution copies of the at least two of the visible-light images, because the colour difference maps can be represented using smaller amount of data (that is, lesser number of bits). Moreover, the aforesaid information comprising the portions of the colour difference maps is transmitted (by the at least one server) to the data repository in a bandwidth-efficient manner, and is stored at the data repository (in the 3D model) in a space-efficient manner. It will be appreciated that, colour differences represented in the colour difference maps could be subsequently employed by the at least one server when generating the output image (corresponding to the new viewpoint), without noticeably degrading the quality of the output image. Beneficially, the (generated) output image would be highly accurate and realistic.

According to the two aforesaid embodiments, when processing the at least two of the visible-light images to generate the lower-resolution copies of the at least two of the visible-light images, the at least one server is configured to employ at least one of: a binning technique, a down sampling technique, an averaging technique, an image scaling technique, a bilinear algorithm, a bicubic interpolation technique, a Lanczos resampling algorithm, a mipmapping algorithm, a guided filter downscaling algorithm. The aforesaid techniques and/or algorithms are well-known in the art. In an example, a resolution of a lower-resolution copy of a given visible-light image may lie in a range of $\frac{1}{16}$ to $\frac{1}{2}$ of an original resolution of the given visible-light image. It will be appreciated that the two aforesaid embodiments are well-suited when the 3D model is implemented as the 3D data structure comprising the plurality of nodes i.e., when the 3D model is implemented as an image-based 3D model.

In yet another embodiment, the computer-implemented method further comprises:
   determining colour differences between the colour information stored in the 3D model and colours captured in the at least two of the visible-light images; and
   encoding the colour differences into spherical harmonics coefficients,
   wherein the information indicative of the different surface irradiances of the given group of 3D points comprises spherical harmonic coefficients corresponding to the given group of 3D points.

In this regard, since the 3D model is created by the at least one server using the visible-light images, the colour information stored in the 3D model is readily available to the at least one server. However, the colour information stored in the 3D model could be only representative of colours of the 3D points on the surfaces of the real objects, and therefore, does not represent different surface irradiances of these 3D points from different viewpoints. Therefore, the at least one server is optionally configured to employ at least one data processing algorithm when utilising the 3D model for determining the colour differences. Optionally, in this regard, the at least one data processing algorithm is employed to transform a 3D point in the 3D model to a corresponding 2D point in a given visible-light image for each of the different viewpoints corresponding to the at least two of the visible-light images. The at least one data processing algorithm could be at least one of: an image synthesis algorithm (such as an RGB-D image synthesis algorithm), a view synthesis algorithm, a rendering algorithm.

Additionally, since the visible light images are received by the at least one server in real time, information pertaining to the colours captured in the at least two of the visible-light images is readily available to the at least one server. Therefore, the at least one server could easily and accurately determine the colour differences. The colour differences could be expressed as described previously. Optionally, when determining the colour differences, the at least one server is configured to employ at least one of: the CIELab-based colour difference formula, the CIEDE2000-based colour difference formula. In an example, an RGB value of a given pixel in a given visible-light image may be 250, 45, and 60, respectively, and an RGB value of a corresponding pixel in the 3D model may be 255, 51, and 51, respectively. Herein, the (RGB) colour difference is computed as 5, 6, and −9.

Throughout the present disclosure, the term "spherical harmonics coefficient" refers to a coefficient of a function that is defined over a spherical or hemispherical domain. In such a function, the spherical harmonics coefficients are indicative of encoded representation of the colour differences. Such an encoded representation is a compact representation of the colour differences. Optionally, an order of spherical harmonics coefficients lies in a range of 1 to 7. Encoding low-frequency surface irradiance into spherical harmonics coefficients is well-known in the art.

It will be appreciated that storage (as well as retrieval) of the spherical harmonic coefficients as the aforesaid information is neither computationally intensive nor time consuming for the at least one server. This is because the encoded colour differences require lesser storage and transmission resources as compared to the colour differences without encoding and to the colour difference maps. As an example, for a second order spherical harmonics coefficients, the RGB colour differences require 27 floats per face for storing the information indicative of the different surface irradiances per viewpoint. It will also be appreciated that even though the spherical harmonics coefficients are generally well-suited for encoding colour differences pertaining to low frequency signals, encoding colour differences corresponding to surface irradiances due to mirrors or other highly reflective materials could also be beneficial and could provide a considerably realistic result. Moreover, the aforesaid information comprising the spherical harmonic coefficients is transmitted by the at least one server to the data repository in a bandwidth-efficient manner, and is stored at the data repository (in the 3D model) in a space-efficient manner. Furthermore, the spherical harmonic coefficients could be decoded (as and when required by the at least one server) into the colour differences, and then the colour differences could be subsequently employed by the at least one server when generating the output image (corresponding to the new viewpoint). Beneficially, the (generated) output image would be highly accurate and realistic. The aforesaid embodiment could be well-suited with any form of the 3D model.

It will also be appreciated that the 3D model stores information pertaining to geometric shapes of the real objects or their portions (for example, such as in the form of depth maps), in addition to storing the colour information (for example, such as in form of colour maps). The colour of the surfaces of the real objects or their portions may be view dependent, but the geometry of the real objects or their portions is not view dependent. Therefore, the at least one server need not store any view dependency information for the depth maps.

Furthermore, optionally, the computer-implemented method further comprises:
utilising the 3D model of the given real-world environment to generate an intermediate image from a perspective of a new viewpoint;
identifying at least one of the plurality of groups of 3D points that corresponds to at least a portion of the intermediate image; and
modulating colours in at least the portion of the intermediate image, based on information indicative of surface irradiances of the at least one of the plurality of groups of 3D points, to generate an output image.

Information indicative of the new viewpoint could be received from a client device that is communicably coupled to the at least one server. The intermediate image is a visual representation of the given real-world environment that is generated from a perspective of the new viewpoint using the 3D model.

Optionally, when utilising the 3D model to generate the intermediate image, the at least one server is configured to employ the at least one data processing algorithm. Optionally, in this regard, the at least one data processing algorithm is employed to transform a 3D point in the 3D model to a 2D point in the intermediate image, from the perspective of the new viewpoint. Examples of the at least one data processing algorithm have been already described earlier. In an example implementation, when the 3D model is in the form of the 3D polygonal mesh, the image synthesis algorithm may be a triangle rasterization algorithm. In another example implementation, when the 3D environment model is in the form of the voxel-based model (such as a Truncated Signed Distance Field (TSDF) model), the image synthesis algorithm may be a ray marching algorithm. In yet another example implementation, when the 3D environment model is in the form of the 3D point cloud, the rendering algorithm may be a point cloud rendering algorithm, a point cloud splatting algorithm, an elliptical weighted-average surface splatting algorithm, and the like.

Since the at least one server divides the 3D points into the plurality of groups of 3D points, visual representation of each group of 3D points is readily known to the at least one server. In addition to this, visual representation of the given real-world environment in the intermediate image is already known to the at least one server (as the at least one server has generated the intermediate image). Therefore, the at least one server could easily and accurately identify which group(s) of 3D points (from amongst the plurality of groups) correspond(s) to at least the portion of the intermediate image. In such a case, the colours of at least the portion of the intermediate image could be requisitely modulated (namely, adjusted) by employing the information indicative of surface irradiances of the at least one of the plurality of groups of 3D points.

Resultantly, the output image thus generated is highly realistic and accurate, for example, in terms of colour information and representation of surface irradiances. This is because upon modulation, the (generated) output image would realistically represent how a surface of a given real object (corresponding to a given group of 3D points) would appear from the new viewpoint. Thus, the output image emulates image viewing characteristics of the human visual system.

It will be appreciated that the at least one server may select information indicative of surface irradiances corresponding to a given viewpoint that is closest to the new viewpoint, or may interpolate information indicative of surface irradiances corresponding to at least two viewpoints that are closest to the new viewpoint. Optionally, in this regard, the computer-implemented method further comprises:

selecting the information indicative of the surface irradiances of the at least one of the plurality of group of 3D points with respect to at least two viewpoints that are closest to the new viewpoint; and blending the information indicative of the surface irradiances with respect to the at least two viewpoints by employing weights calculated based on at least one of: angle differences between the new viewpoint and respective ones of the at least two viewpoints, differences between a new angular width of the at least one of the plurality of groups of 3D points with respect to the new viewpoint and respective ones of different angular widths of the at least one of the plurality of groups of 3D points with respect to the at least two viewpoints.

In this regard, when the at least two viewpoints closest to the new viewpoint, it is highly likely that a considerable number of groups of 3D points are commonly captured from the at least two (known) viewpoints and the new viewpoint. By "closest to the new viewpoint", it is not meant that the at least two viewpoints are physically close to the new viewpoint, but it is meant that there is at least a partial overlap between a field of view from the new viewpoint and respective ones of fields of view from the at least two viewpoints.

The information indicative of the surface irradiances with respect to the at least two viewpoints is optionally blended (namely, interpolated), prior to employing said information for modulating the colours in at least the portion of the intermediate image to generate the output image. In this regard, such a blending is performed by calculating the weights for each of the information indicative of the surface irradiances with respect to the at least two viewpoints. In other words, when blending the information indicative of the surface irradiances with respect to the at least two viewpoints, different weights (for example, ranging from 0 to 1) could be applied to each of the aforesaid information. It will be appreciated that such a manner of blending the aforesaid information results in the output image that is accurate and realistic, and has high visual detail.

Optionally, lesser the angle difference between the new viewpoint and a given viewpoint from amongst the at least two viewpoints, greater is the weight assigned to the information indicative of the surface irradiances with respect to the given viewpoint, and vice versa. Optionally, lesser the difference between the new angular width with respect to the new viewpoint and a given angular width with respect to a given viewpoint from amongst the at least two viewpoints, greater is the weight assigned to the information indicative of the surface irradiances with respect to the given viewpoint, and vice versa. This is because when the given viewpoint is nearer to the new viewpoint, larger number of groups of 3D points are common between the given viewpoint and the new viewpoint, and a difference between a perspective of the given viewpoint and a perspective of the new viewpoint is minimal. The angular width could be expressed in terms of degrees or radians. In an example, when the weights range from 0 to 1, weights of 0.65, 0.25, and 0.10 may be assigned to the information indicative of the surface irradiances with respect to a first viewpoint that is nearest to the new viewpoint, a second viewpoint that is second nearest to the new viewpoint, and a third viewpoint that is farthest from the new viewpoint, respectively.

Moreover, optionally, the 3D model further stores a per-pixel mask, and wherein the step of modulating the colours comprises employing the per-pixel mask to control a modulation to be applied to the colours in at least the portion of the intermediate image. Herein, the term "per-pixel mask" refers to a digital mask that is used to control the modulation to be applied to the colours (i.e., which pixel's colour values are to be modulated and/or an extent of modulation to be applied) in at least the portion of the intermediate image for generating the output image. In this regard, pixels in at least the portion of the intermediate image that are to be modulated are indicated on the per-pixel mask. Thus, the at least one server can easily and accurately know which pixels are to be modulated (based on the information indicative of surface irradiances), for generating the output image. Moreover, the per-pixel mask may or may not have a defined shape and/or size. The technical benefit of employing the per-pixel mask is that the per-pixel mask enables in accurately indicating pixels pertaining to boundaries of the real objects that could be made of different materials, which might otherwise be not indicated properly as boundaries of different groups of 3D points. In other words, the per-pixel mask allows for controlling modulation to be applied to colours pertaining to the different materials of which the real objects are made. Furthermore, the per-pixel mask takes into account modulation to be applied for different parts of a surface of the real objects (such as tiled walls) having different reflective properties. The different reflective properties could be due to undulations on the surface and/or differences in types of material of the surface.

Optionally, the 3D model stores the colour information pertaining to the 3D points on the surfaces of the real objects in a form of a colour map. The term "colour map" refers to a data structure (such as a 3D point cloud) comprising the colour information pertaining to the 3D points on the surfaces of the real objects. It will be appreciated that the colour map could be implemented as one of: an RGB colour map, an RGB-A colour map, an RGB-D colour map, a CMYK colour map, a YUV colour map.

In an embodiment, the per-pixel mask is stored as a bitmask on the colour map indicating which pixels' colour values are to be modulated and which pixels' colour values are to be left unmodulated. In such a case, binary representation of bits is used to indicate (namely, signal or flag) which pixels in at least the portion of the intermediate image are affected by the modulation. In an example, when the pixels' colour values are to be modulated, a bit value of '1' could be associated with such pixels. When the pixels' colour values are to be left unmodulated, a bit value of '0' could be associated with such pixels. Beneficially, in this manner, the at least one server can easily and accurately know which pixels are to be modulated (based on their associated bit values).

In another embodiment, the per-pixel mask is stored as a grayscale mask on the colour map indicating a magnitude of the modulation to be applied. When the per-pixel mask is stored as the grayscale mask, more than one bit per pixel is used to indicate which pixels in at least the portion of the intermediate image are affected by the modulation as well as the magnitude of the modulation (namely, an extent of modulation) that is to be applied. The magnitude of the modulation could lie in a range of 0 percent to 100 percent. Beneficially, in this manner, the at least one server can easily and accurately know which pixels are to be modulated and how much modulated (based on their associated bit values).

The present disclosure also relates to the system as described above. Various embodiments and variants disclosed above, with respect to the aforementioned first aspect, apply mutatis mutandis to the system and the computer program product.

In an embodiment, the at least one server is further configured to process the at least two of the visible-light images to generate lower-resolution copies of the at least two of the visible-light images, wherein the information indicative of the different surface irradiances of the given group of 3D points comprises portions of the lower-resolution copies of the at least two of the visible-light images that represent the given group of 3D points.

In another embodiment, the at least one server is further configured to:
process the at least two of the visible-light images to generate lower-resolution copies of the at least two of the visible-light images; and
generate colour difference maps representative of colour differences in the lower-resolution copies of the at least two of the visible-light images with respect to the at least two of the visible-light images, wherein the information indicative of the different surface irradiances of the given group of 3D points comprises portions of the colour difference maps that represent the given group of 3D points.

In yet another embodiment, the at least one server is further configured to:
determine colour differences between the colour information stored in the 3D model and colours captured in the at least two of the visible-light images; and
encode the colour differences into spherical harmonics coefficients, wherein the information indicative of the different surface irradiances of the given group of 3D points comprises spherical harmonic coefficients corresponding to the given group of 3D points.

Optionally, the at least one server is further configured to:
utilise the 3D model of the given real-world environment to generate an intermediate image from a perspective of a new viewpoint;
identify at least one of the plurality of groups of 3D points that corresponds to at least a portion of the intermediate image; and
modulate colours in at least the portion of the intermediate image, based on information indicative of surface irradiances of the at least one of the plurality of groups of 3D points, to generate an output image.

Optionally, the at least one server is further configured to:
select the information indicative of the surface irradiances of the at least one of the plurality of group of 3D points with respect to at least two viewpoints that are closest to the new viewpoint; and
blend the information indicative of the surface irradiances with respect to the at least two viewpoints by employing weights calculated based on at least one of: angle differences between the new viewpoint and respective ones of the at least two viewpoints, differences between a new angular width of the at least one of the plurality of groups of 3D points with respect to the new viewpoint and respective ones of different angular widths of the at least one of the plurality of groups of 3D points with respect to the at least two viewpoints.

Optionally, the 3D model further stores a per-pixel mask, and the at least one server is further configured to modulate the colours by employing the per-pixel mask to control a modulation to be applied to the colours in at least the portion of the intermediate image. The per-pixel mask could be employed as a bitmask or a grayscale mask, as described earlier.

DETAILED DESCRIPTION OF THE DRAWINGS

Referring to FIG. 1, illustrated is a block diagram of an architecture of a system 100 for improving image reconstruction with view-dependent surface irradiance, in accordance with an embodiment of the present disclosure. The imaging system 100 comprises a data repository 102 and at least one server (depicted as a server 104). The data repository 102 is communicably coupled to the server 104. Optionally, the server 104 is communicably coupled to at least one visible-light camera (depicted as a visible-light camera 106) or at least one device comprising the at least one visible-light camera.

It may be understood by a person skilled in the art that the FIG. 1 includes a simplified architecture of the system 100 for sake of clarity, which should not unduly limit the scope of the claims herein. It is to be understood that the specific implementation of the system 100 is provided as an example and is not to be construed as limiting it to specific numbers or types of servers, data repositories, and visible-light cameras. The person skilled in the art will recognize many variations, alternatives, and modifications of embodiments of the present disclosure.

Figure 2:
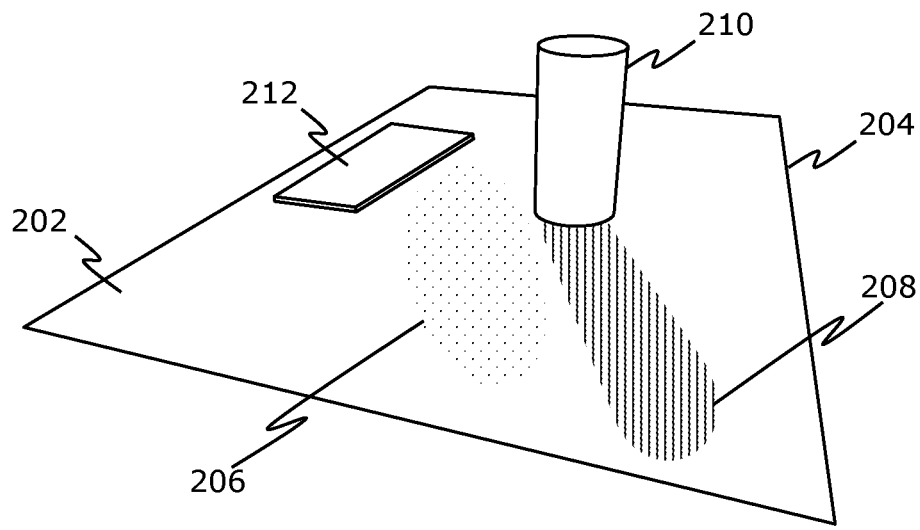
FIG. 2 illustrates an exemplary scenario of dividing 3D points on a surface of a real object into a plurality of groups of 3D points, in accordance with an embodiment of the present disclosure.

Referring to FIG. 2, illustrated is an exemplary scenario of dividing 3D points on a surface 202 of a real object 204 (for example, depicted as a table) into a plurality of groups of 3D points, in accordance with an embodiment of the present disclosure. The surface 202 of the real object 204 is shown, for example, as a semi-glossy surface having a (view-dependent) surface irradiance 206 (depicted as an oval-shaped dotted pattern) towards a central region of the surface 202. The surface irradiance 206 has a significantly different colour information as compared to a remaining region of the surface 202. Moreover, the surface 202 is shown to have a portion on which a shadow 208 (depicted as a vertical-striped pattern) of a real object 210 is being formed; said portion of the surface 202 has no view-dependent surface irradiance. Similarly, a real object 212 having a matte finish is shown to be placed upon the surface 202; the real object 212 has minimal to no view-dependent surface irradiance. Both of the shadow 208 and the real object 212 lie on the surface 202. 3D points on a region of the surface 202 apart from the portions on which the shadow 208 and the real object 212 lie could be grouped together to form a first group of 3D points. 3D points on the portion of the surface 202 on which the shadow 202 is formed and 3D points on the real object 212 could be grouped together to form a second group of 3D points and a third group of 3D points, respectively.

Figures 3A, 3B:
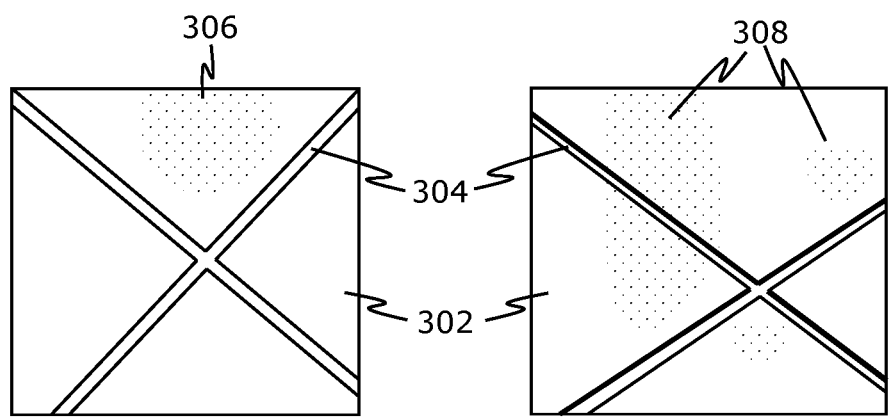
FIGS. 3A and 3B illustrate exemplary scenarios of viewing a real object from different viewpoints, in accordance with an embodiment of the present disclosure.

Referring to FIGS. 3A and 3B, illustrated are exemplary scenarios of viewing a real object from different viewpoints, in accordance with an embodiment of the present disclosure. As shown, a real object is represented as a portion of a tiled wall 302 having mortar seams 304. In FIG. 3A, the portion of the tiled wall 302 is viewed from a first viewpoint, and a surface of the portion of the tiled wall 302 appears to be semi-glossy, and is shown to have a (view-dependent) surface irradiance 306 towards an upper region of said portion. In FIG. 3B, the portion of the tiled wall 302 is viewed from a second viewpoint, and the surface of the portion of the tiled wall 302 is shown to have multiple surface irradiances 308. As shown, surface irradiances of some parts of the tiled wall 302 change as a perspective is changed from the first viewpoint to the second viewpoint. It will be appreciated that the mortar seams 304 in both the FIGS. 3A and 3B do not have much view-dependent surface irradiance changes, as the mortar seams 304 do not exhibit high reflectivity.

FIGS. 2, 3A and 3B, are merely examples, which should not unduly limit the scope of the claims herein. The person skilled in the art will recognize many variations, alternatives, and modifications of embodiments of the present disclosure.

Figure 4:
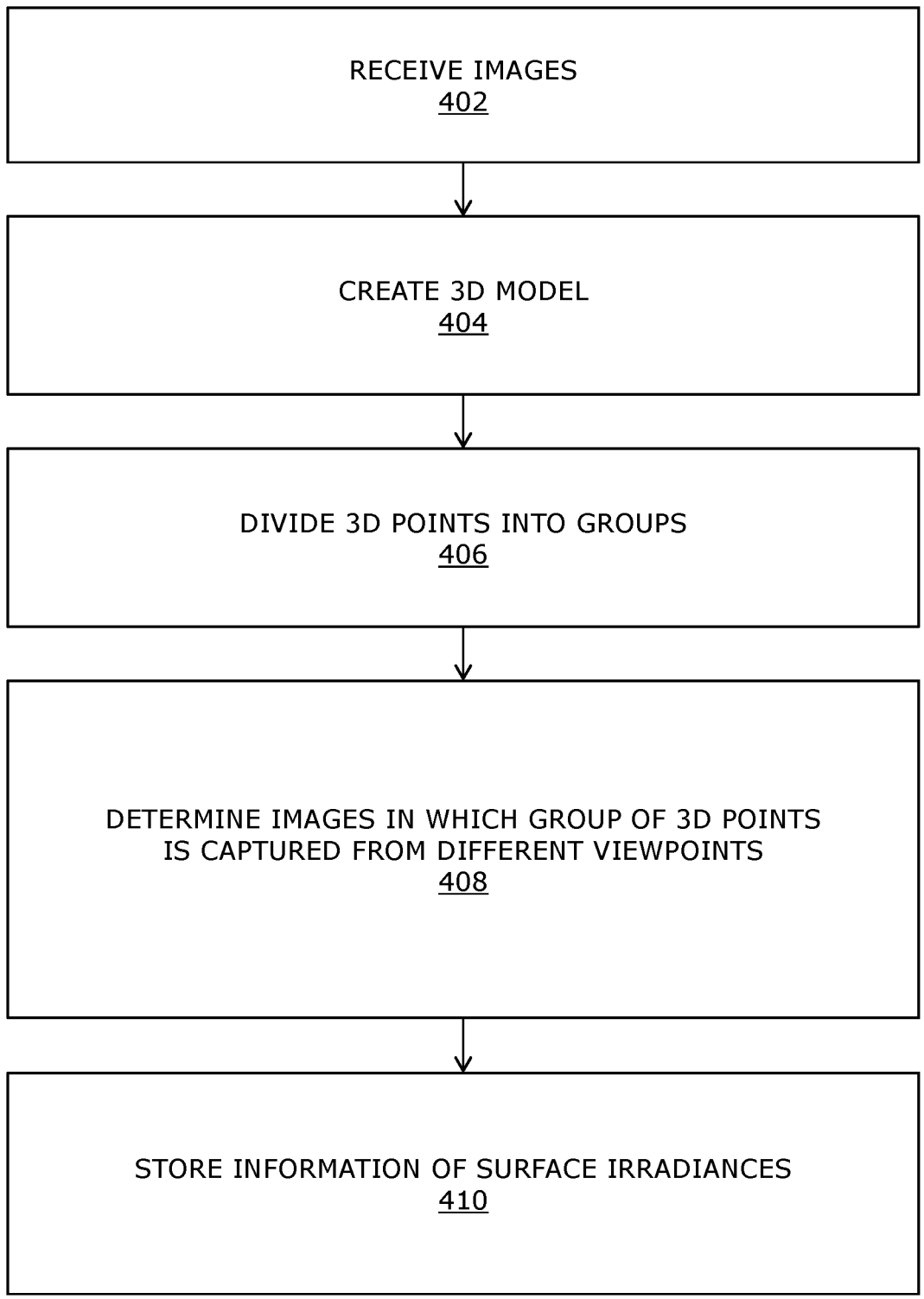
FIG. 4 illustrates steps of a method for improving image reconstruction with view-dependent surface irradiance, in accordance with an embodiment of the present disclosure.

Referring to FIG. 4, illustrated are steps of a method for improving image reconstruction with view-dependent surface irradiance, in accordance with an embodiment of the present disclosure. At step 402, visible-light images of a given real-world environment that are captured from a plurality of viewpoints using at least one visible-light camera are received. At step 404, the visible-light images are processed, based on the plurality of viewpoints, to create a three-dimensional (3D) model of the given real-world environment, wherein the 3D model stores colour information pertaining to 3D points on surfaces of real objects present in the given real-world environment. At step 406, the 3D points are divided into a plurality of groups of 3D points, based on at least one of: whether a surface normal of 3D points in a given group lie within a predefined threshold angle from each other, differences in materials from which the real objects are made, differences in textures of the surfaces of the real objects. At step 408, for a given group of 3D points, at least two of the visible-light images are determined in which the given group of 3D points is captured from different viewpoints, wherein the at least two of the visible-light images are representative of different surface irradiances of the given group of 3D points as captured from the different viewpoints. At step 410, information indicative of the different surface irradiances of the given group of 3D points as captured from the different viewpoints is stored in the 3D model of the given real-world environment.

The aforementioned steps are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A computer-implemented method comprising:
   receiving visible-light images of a given real-world environment that are captured from a plurality of viewpoints using at least one visible-light camera;
   processing the visible-light images, based on the plurality of viewpoints, to create a three-dimensional (3D) model of the given real-world environment, wherein the 3D model stores colour information pertaining to 3D points on surfaces of real objects present in the given real-world environment;
   dividing the 3D points into a plurality of groups of 3D points, based on at least one of: whether surface normals of 3D points in a given group lie within a predefined threshold angle from each other, differences in materials from which the real objects are made, differences in textures of the surfaces of the real objects;
   for a given group of 3D points, determining at least two of the visible-light images in which the given group of 3D points is captured from different viewpoints, wherein the at least two of the visible-light images are representative of different surface irradiances of the given group of 3D points as captured from the different viewpoints; and
   storing, in the 3D model of the given real-world environment, information indicative of the different surface irradiances of the given group of 3D points as captured from the different viewpoints;
   wherein the 3D model of the given real-world environment is implemented as a 3D data structure comprising a plurality of nodes, each node representing a respective convex-polyhedral region of a 3D space occupied by the given real-world environment, wherein each node stores corresponding portions of the visible-light images whose pixels' 3D positions fall inside a respective convex-polyhedral region of the 3D space, wherein for a visible-light image captured from a given viewpoint, each portion of the visible-light image is stored in a corresponding node along with a direction vector indicating any one of: a direction of a depth axis of the visible-light image from the given viewpoint, or a view direction from the given viewpoint to a corresponding convex-polyhedral region;
   the method further comprising:
   processing the at least two of the visible-light images to generate lower-resolution copies of the at least two of the visible-light images, wherein the information indicative of the different surface irradiances of the given group of 3D points comprises portions of the lower-resolution copies of the at least two of the visible-light images that represent the given group of 3D points;
   processing the at least two of the visible-light images to generate lower-resolution copies of the at least two of the visible-light images; and
   generating colour difference maps representative of colour differences in the lower-resolution copies of the at least two of the visible-light images with respect to the at least two of the visible-light images,
   wherein the information indicative of the different surface irradiances of the given group of 3D points comprises portions of the colour difference maps that represent the given group of 3D points.

2. The computer-implemented method of claim 1, further comprising:
   determining colour differences between the colour information stored in the 3D model and colours captured in the at least two of the visible-light images; and
   encoding the colour differences into spherical harmonics coefficients,
   wherein the information indicative of the different surface irradiances of the given group of 3D points comprises spherical harmonic coefficients corresponding to the given group of 3D points.

3. The computer-implemented method of claim 1, further comprising:
   utilising the 3D model of the given real-world environment to generate an intermediate image from a perspective of a new viewpoint;

identifying at least one of the plurality of groups of 3D points that corresponds to at least a portion of the intermediate image; and modulating colours in at least the portion of the intermediate image, based on information indicative of surface irradiances of the at least one of the plurality of groups of 3D points, to generate an output image.

4. The computer-implemented method of claim 3, further comprising:

selecting the information indicative of the surface irradiances of the at least one of the plurality of group of 3D points with respect to at least two viewpoints that are closest to the new viewpoint; and blending the information indicative of the surface irradiances with respect to the at least two viewpoints by employing weights calculated based on at least one of: angle differences between the new viewpoint and respective ones of the at least two viewpoints, differences between a new angular width of the at least one of the plurality of groups of 3D points with respect to the new viewpoint and respective ones of different angular widths of the at least one of the plurality of groups of 3D points with respect to the at least two viewpoints.

5. The computer-implemented method of claim 3, wherein the 3D model further stores a per-pixel mask, and wherein the step of modulating the colours comprises employing the per-pixel mask to control a modulation to be applied to the colours in at least the portion of the intermediate image.

6. The computer-implemented method of claim 5, wherein the 3D model stores the colour information pertaining to the 3D points on the surfaces of the real objects in a form of a colour map, and wherein the per-pixel mask is stored as a bitmask on the colour map indicating which pixels' colour values are to be modulated and which pixels' colour values are to be left unmodulated.

7. The computer-implemented method of claim 5, wherein the 3D model stores the colour information pertaining to the 3D points on the surfaces of the real objects in a form of a colour map, and wherein the per-pixel mask is stored as a grayscale mask on the colour map indicating a magnitude of the modulation to be applied.

8. A system comprising:

at least one server configured to:
receive visible-light images of a given real-world environment that are captured from a plurality of viewpoints using at least one visible-light camera;
process the visible-light images, based on the plurality of viewpoints, to create a three-dimensional (3D) model of the given real-world environment, wherein the 3D model stores colour information pertaining to 3D points on surfaces of real objects present in the given real-world environment;
divide the 3D points into a plurality of groups of 3D points, based on at least one of: whether surface normals of 3D points in a given group lie within a predefined threshold angle from each other, differences in materials from which the real objects are made, differences in textures of the surfaces of the real objects;
for a given group of 3D points, determine at least two of the visible-light images in which the given group of 3D points is captured from different viewpoints, wherein the at least two of the visible-light images are representative of different surface irradiances of the given group of 3D points as captured from the different viewpoints; and
store, in the 3D model of the given real-world environment, information indicative of the different surface irradiances of the given group of 3D points as captured from the different viewpoints; and a data repository, communicably coupled to the at least one server, that is to be employed to store the 3D model, wherein the 3D model of the given real-world environment is implemented as a 3D data structure comprising a plurality of nodes, each node representing a respective convex-polyhedral region of a 3D space occupied by the given real-world environment, wherein each node stores corresponding portions of the visible-light images whose pixels' 3D positions fall inside a respective convex-polyhedral region of the 3D space, wherein for a visible-light image captured from a given viewpoint, each portion of the visible-light image is stored in a corresponding node along with a direction vector indicating any one of: a direction of a depth axis of the visible-light image from the given viewpoint, or a view direction from the given viewpoint to a corresponding convex-polyhedral region, wherein the at least one server is further configured to process the at least two of the visible-light images to generate lower-resolution copies of the at least two of the visible-light images, wherein the information indicative of the different surface irradiances of the given group of 3D points comprises portions of the lower-resolution copies of the at least two of the visible-light images that represent the given group of 3D points, wherein the at least one server is further configured to:
process the at least two of the visible-light images to generate lower-resolution copies of the at least two of the visible-light images; and
generate colour difference maps representative of colour differences in the lower-resolution copies of the at least two of the visible-light images with respect to the at least two of the visible-light images,
wherein the information indicative of the different surface irradiances of the given group of 3D points comprises portions of the colour difference maps that represent the given group of 3D points.

9. The system of claim 8, wherein the at least one server is further configured to:
determine colour differences between the colour information stored in the 3D model and colours captured in the at least two of the visible-light images; and
encode the colour differences into spherical harmonics coefficients,
wherein the information indicative of the different surface irradiances of the given group of 3D points comprises spherical harmonic coefficients corresponding to the given group of 3D points.

10. The system of claim 8, wherein the at least one server is further configured to:
utilise the 3D model of the given real-world environment to generate an intermediate image from a perspective of a new viewpoint;
identify at least one of the plurality of groups of 3D points that corresponds to at least a portion of the intermediate image; and modulate colours in at least the portion of the intermediate image, based on information indicative of surface irradiances of the at least one of the plurality of groups of 3D points, to generate an output image.

11. The system of claim 10, wherein the at least one server is further configured to:
select the information indicative of the surface irradiances of the at least one of the plurality of group of 3D points with respect to at least two viewpoints that are closest to the new viewpoint; and
blend the information indicative of the surface irradiances with respect to the at least two viewpoints by employing weights calculated based on at least one of: angle differences between the new viewpoint and respective ones of the at least two viewpoints, differences between a new angular width of the at least one of the plurality of groups of 3D points with respect to the new viewpoint and respective ones of different angular widths of the at least one of the plurality of groups of 3D points with respect to the at least two viewpoints.

12. The system of claim 10, wherein the 3D model further stores a per-pixel mask, and wherein the at least one server is further configured to modulate the colours by employing the per-pixel mask to control a modulation to be applied to the colours in at least the portion of the intermediate image.

13. The system of claim 12, wherein the 3D model stores the colour information pertaining to the 3D points on the surfaces of the real objects in a form of a colour map, and wherein the per-pixel mask is stored as a bitmask on the colour map indicating which pixels' colour values are to be modulated and which pixels' colour values are to be left unmodulated.

14. The system of claim 12, wherein the 3D model stores the colour information pertaining to the 3D points on the surfaces of the real objects in a form of a colour map, and wherein the per-pixel mask is stored as a grayscale mask on the colour map indicating a magnitude of the modulation to be applied.

15. A computer program product comprising a non-transitory machine-readable data storage medium having stored thereon program instructions that, when executed by a processor, cause the processor to:
receive visible-light images of a given real-world environment that are captured from a plurality of viewpoints using at least one visible-light camera;
process the visible-light images, based on the plurality of viewpoints, to create a three-dimensional (3D) model of the given real-world environment, wherein the 3D model stores colour information pertaining to 3D points on surfaces of real objects present in the given real-world environment;
divide the 3D points into a plurality of groups of 3D points, based on at least one of: whether surface normals of 3D points in a given group lie within a predefined threshold angle from each other, differences in materials from which the real objects are made, differences in textures of the surfaces of the real objects;
for a given group of 3D points, determine at least two of the visible-light images in which the given group of 3D points is captured from different viewpoints, wherein the at least two of the visible-light images are representative of different surface irradiances of the given group of 3D points as captured from the different viewpoints; and
store, in the 3D model of the given real-world environment, information indicative of the different surface irradiances of the given group of 3D points as captured from the different viewpoints,
wherein the 3D model of the given real-world environment is implemented as a 3D data structure comprising a plurality of nodes, each node representing a respective convex-polyhedral region of a 3D space occupied by the given real-world environment, wherein each node stores corresponding portions of the visible-light images whose pixels' 3D positions fall inside a respective convex-polyhedral region of the 3D space, wherein for a visible-light image captured from a given viewpoint, each portion of the visible-light image is stored in a corresponding node along with a direction vector indicating any one of: a direction of a depth axis of the visible-light image from the given viewpoint, or a view direction from the given viewpoint to a corresponding convex-polyhedral region;
wherein the program instructions further cause the processor to:
process the at least two of the visible-light images to generate lower-resolution copies of the at least two of the visible-light images, wherein the information indicative of the different surface irradiances of the given group of 3D points comprises portions of the lower-resolution copies of the at least two of the visible-light images that represent the given group of 3D points;
process the at least two of the visible-light images to generate lower-resolution copies of the at least two of the visible-light images; and
generate colour difference maps representative of colour differences in the lower-resolution copies of the at least two of the visible-light images with respect to the at least two of the visible-light images,
wherein the information indicative of the different surface irradiances of the given group of 3D points comprises portions of the colour difference maps that represent the given group of 3D points.

* * * * *